Figure 1:
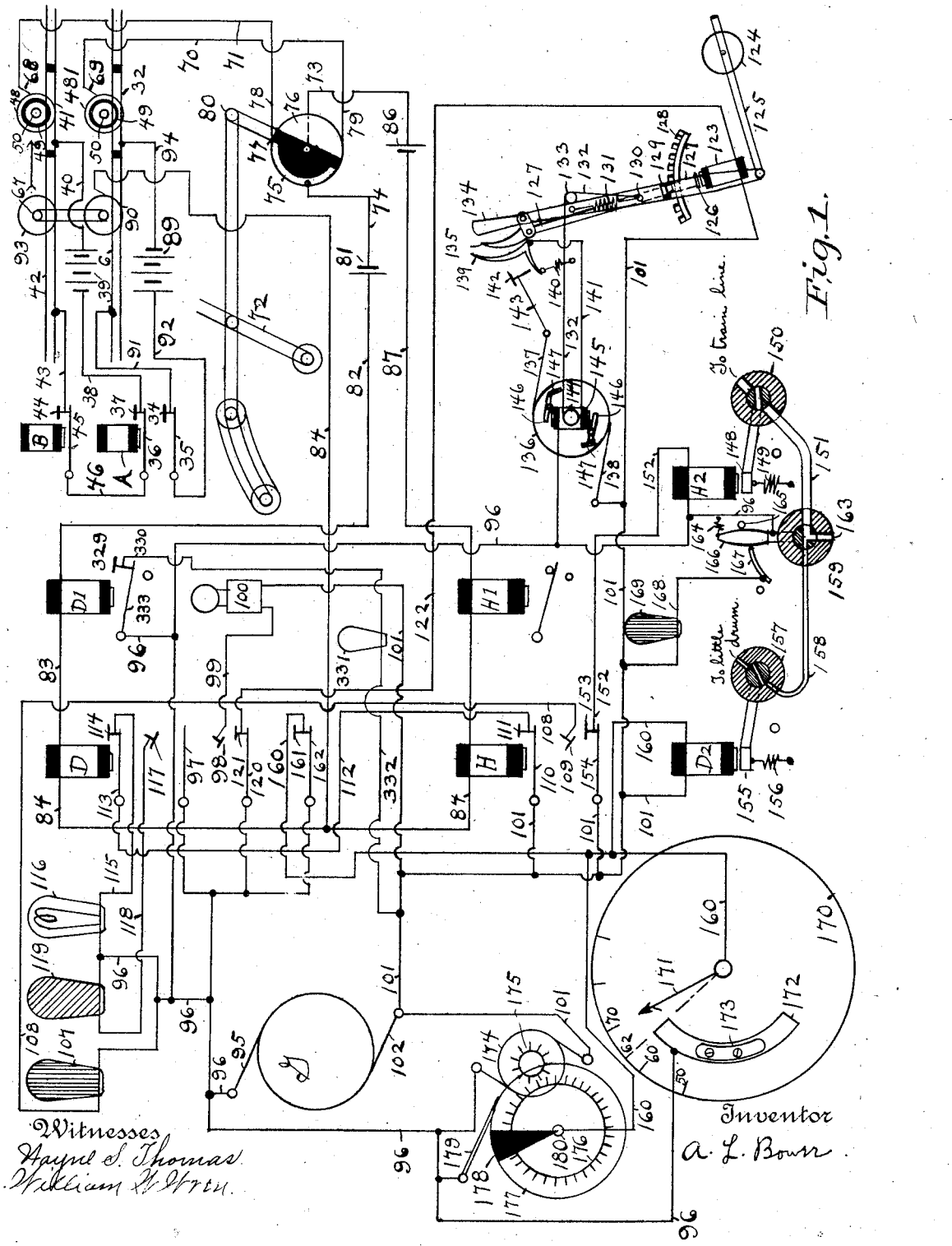

A. L. BOWER.
TRAIN CONTROLLING DEVICE.
APPLICATION FILED JAN. 25, 1909.

1,173,552.

Patented Feb. 29, 1916.
2 SHEETS—SHEET 1.

Witnesses
Hayne S. Thomas
William H. Wren

Inventor
A. L. Bower

A. L. BOWER.
TRAIN CONTROLLING DEVICE.
APPLICATION FILED JAN. 25, 1909.

1,173,552.

Patented Feb. 29, 1916.
2 SHEETS—SHEET 2.

Fig. 2.

Witnesses
Charles B. Dotterer
Lewis P. E. Begly

Inventor
A. L. Bower

UNITED STATES PATENT OFFICE.

ABRAM L. BOWER, OF BOYERTOWN, PENNSYLVANIA.

TRAIN-CONTROLLING DEVICE.

1,173,552.  Specification of Letters Patent.  Patented Feb. 29, 1916.

Application filed January 25, 1909. Serial No. 474,182.

*To all whom it may concern:*

Be it known that I, ABRAM L. BOWER, a citizen of the United States, residing at Boyertown, in the county of Berks and State of Pennsylvania, have invented a new and useful Improvement in Train-Controlling Devices, of which the following is a specification.

This invention relates to improvements in train controlling devices wherein home and distant signals are displayed in the cab and in addition the power is shut off and the service application of the brakes is made when the cautionary signal is displayed, also the emergency application of the brakes is made when the danger signal is shown. An improved form of cab signal circuit is shown consisting of two relays and two cab signal circuits, one transmitting distant signals, and the other transmitting home signals. These relays may be polarized relays but the ordinary type of relay will serve the purpose. These devices are well adapted to be used in connection with the signal systems described in Patents Nos. 788,513 and 832,652 granted respectively to me on May 2, 1905 and Oct. 9, 1906.

With the above and other objects in view, as will appear as the nature of the invention is better understood, the same consists in the novel construction and combination of parts of a safety attachment for locomotives, as will be hereinafter fully described and claimed.

In the accompanying drawings forming a part of this specification, and in which like characters of reference indicate corresponding parts, there are illustrated several forms of embodiment of the invention capable of carrying the same into effect, it being understood that the elements therein exhibited may be varied or changed as to shape, proportion, and exact manner of arrangement without departing from the spirit thereof, and in these drawings,—

Figure 1 is a diagrammatic view, partly in section, exhibiting a system for carrying out the objects stated. Fig. 2 shows a track plan with connections to track relays used.

At A and B are shown track relays, A being a home relay and B, a distant relay. Relay A operates an arm 35 which may be operated manually. Arm 35 and contact post 34 constitute a circuit breaker, the signaling circuit to rail 6 and insulated rail section 32 being broken at point 34 when relay A is not energized. Relay A also operates arm 36 with contact post 37 above forming a circuit breaker in the circuit to rail 41 and the left hand rail 42. Relay B operates arm 45 with contact post 44 above forming a circuit breaker also in the circuit to rails 41 and 42. Relay B may also be operated manually. Relay A is the home track relay of the block and controls relay H and magnet $H^1$ on the train. Relay B is the distant track relay and controls the distant relays D and $D^1$ on the train. The circuit to the track relays A and B is as follows:—from a track battery 501, to wire 502, rail 42, wire 503, relay B, wire 504, relay A, wire 505, rail 6 and wire 506 to the battery. This is shown in Fig. 2. The arrow shows the direction of train movement.

In this system, the engine and tender may be insulated by means of fiber, a pair of axles or a truck may be insulated from the rest of the train, or the tires of the front pony truck wheels or other wheels may be insulated from the axles. The insulated portions constitute one terminal of the train signaling circuit and the uninsulated wheels of the engine constitute the other terminal.

At any location on the track where a signal is desired on the train two insulated rails 41 and 32 twelve feet long or less are inserted in the main rails just opposite each other. Rail 41 is a part of the left hand rail 42 and rail 32 is a part of right hand rail 6. The right hand insulated signal rail transmits home signals and the left hand signal rail transmits distant signals.

At 77 is shown a pole changer which may be a two-segment commutator. The insulation between the two halves of the commutator is in line with rod 80 connected to the reverse lever 72. As shown brush 78 connected to tire 48 by brush 68 and wire 71, rests upon segment 75 and brush 79 connected to tire 481 by a brush 69 and wire 70, rests against segment 76. Wire 74 connected to segment 75 leads to the negative pole of a single cell of battery 81. Wire 82 connected to the positive pole of the battery leads to the distant relays D and $D^1$ connected together by wire 83. These reverse lever connections are desirable to connect the home relay to the right hand rail and the distant relay to the left hand rail whether the train goes forward or backward. It will be understood that backing will not be permitted on the rail shown. The engine must switch over to the opposite track first.

Wire 73 connected to segment 76 leads to the positive pole of battery 86 and wire 87, connected to the negative pole of the battery leads to home relays H and H¹ connected by wire 88. A common wire 84 connects relays H and D to an axle 67 and the uninsulated wheels of the engine.

It will be noted that the cab signal circuit has two branches. This is desirable on a double track road. On a single track road, the circuit shown in my Patent No. 832652 is preferable.

Battery 81 maintains the distant signal and battery 86, the home signal. Batteries 89 and 81 supply the same direction of current to the circuit of distant relay D and batteries 89 and 86 supply current flowing in one direction through home relay H.

Relays D and H may be polarized relays but the ordinary type of relay can be used.

Batteries 81 and 86 are weak batteries consisting each of a single cell. The current supplied by one of these batteries is sufficient to hold its magnet armature up only after being drawn up by outside current from a track battery. If these batteries are not connected in the predetermined way to the rails and relays no clear signal can be transmitted except for a short period of time while wheel 90 is on rail 6 and wheel 481, on rail 32. The clear signal can not be maintained while the train runs through the block unless the two batteries in a circuit supply current in the same direction because of a reversal of the poles of the relay in that circuit by the current of the maintaining battery when the track battery is shunted out of the cab signal circuit.

The circuit to the distant cab relays is as follows,—from battery 81 through wire 82, magnet D¹, wire 83, relay D, wire 84, wheel 93, rail 42, wire 43, contact 44, arm 45, wire 46, arm 36, contact 37, wire 38, battery 39, wire 40, rail 41, tire 48, brush 68, wire 71, brush 78, segment 75 and wire 74 to the battery.

The circuit to the home cab relays is as follows,—from battery 86, through wire 73, segment 76, brush 79, wire 70, brush 69, tire 481, rail 32, wire 94, battery 89, wire 92, arm 35, contact post 34, wire 91, rail 6, wheel 90, common wire 84, relay H, wire 88, magnet H¹, and wire 87 to the battery.

When connected as just described the home and distant relays are energized, clear signals are displayed and the throttle and brakes are entirely under the engineer's control. When home track relay A is not energized, the circuits to these relays are broken at points 37 and 34, the brakes are applied and the locking device of the throttle lever becomes inoperative. When distant track relay B only is deënergized, the circuit to the distant cab relays is broken at point 44 and the cautionary signals are displayed, the throttle lever locking device becomes inoperative and the service application of the brakes is made. When the engine is reversed, pole changer 77 connects tire 48 which is then the right hand tire to home cab relay H, through brush 78 which then rests upon segment 76. The pole changer also connects tire 481 which is then the left hand pony truck wheel tire to distant cab relay D, through brush 79 which then rests against segment 75.

If the insulation between segments 75 and 76 is broad enough, the circuits will be broken when the reverse lever is turned, but the engineer may control his brakes and throttle lever as will be described later. When he reaches a signal location, he will find that his tire 48 is on the right hand signal rail 32 and his tire 481, on the left hand signal rail which will transmit the correct signals for that direction of movement.

In the balance of this description I shall refer to the home and distant cab relays, it being understood that the cab signal circuit admits of considerable variation and modification but that the home cab relays are energized when the home track relays are energized which occurs when the line is clear for one block and that the distant cab relays are energized when the distant track relays are energized which occurs when the line is clear for two blocks ahead.

A turbo generator G which is driven by steam from the boiler supplies an electric current to operate the devices which will be described later on, but a storage battery or a primary battery may be used instead.

A bell 100 or other audible signal is operated when the distant relay D is deënergized. This occurs at all times except when the line is clear for two blocks. Arm 97 falls back to contact post 98. The circuit to bell 100 is as follows,—from generator G, through brush 102, wire 101, bell 100, wire 99, contact 98, arm 97, wire 96 and brush 95 to the generator. A suitable resistance may be used with any of the devices in case the generator current is too heavy.

A red colored incandescent lamp 107, a green one 119 and a clear one 116 are connected by wire 96 to brush 95 of generator G. A wire 108 connects light 107 to contact 109 below arm 110 of home relay H which is connected by wire 101 to brush 102 of generator G. Contact post 111 above arm 110, is connected by wire 112 to arm 113 controlled by distant relay D. Contact 114 above arm 113 is connected by wire 115 to clear light 116. Contact post 117 below arm 113 is connected by wire 118 to green light 119. One light burns at all times.

The circuit to red light 107 is as follows,—from generator G, through brush 102, wire 101, arm 110, contact 109, wire 108, light 107, wire 96 and brush 95 to the generator.

The circuit to green light 119 is as follows,—from generator G through brush 102, wire 101, arm 110, contact post 111, wire 112, arm 113, contact post 117, wire 118, light 119, wire 96 and brush 95 to the generator.

The circuit to clear light 116 is as follows,—from generator G, through brush 102, wire 101, arm 110, contact 111, wire 112, arm 113, contact 114, wire 115, light 116, wire 96 and brush 95 to the generator.

When home realy H is energized, arm 113 controlled by distant relay D connects with clear light 116 if relay D is also energized and with green light 119 through contact post 117 if relay D is not energized. When relay H is not energized, arm 110 connects with red light 107 through contact post 109. Thus the proper signal is displayed. The spring which ordinarily operates the throttle lever locking device 129 is removed and spring 131 operating to unlock the lever is used instead. This spring must be strong enough to unlock the lever when magnet 123 is not energized. Arm 120 controlled by distant relay D is connected by wire 96 to brush 95 of generator G and is in relation to contact post 121 above, connected by wire 122 to magnet 123 which magnet is connected by wire 101 to brush 102 of generator G. When the second block ahead becomes obstructed, the green lamp 119 lights up and arm 120 drops out of contact with point 121, deënergizing magnet 123 which releases armature 126, which in turn is drawn up by rod 127 and spring 131, unlocking the throttle lever. Weight 124, near the end of arm 125 fastened to the throttle lever is now unsupported and drops, pulling lever 135 to the right and shutting off the steam. The contact device 139 is mounted on the throttle lever and has its lower end drawn away from contact post 142 by spring 140. When the engineer desires to turn off the steam, he does not touch part 139; but when he desires to turn on steam he grasps handle 134 of the lever and part 139 which touches contact post 142 closing the following circuit,—from generator G, through brush 102, wire 101, brush 138 of motor 136, brush 137, wire 143, contacts 142 and 139, wire 141, a magnet 145 mounted on a pulley shaft 144 on which a cord or chain 132 is wound, thence to wire 96 and brush 95 of generator G.

Cord 132 passes over a pulley 133 mounted on the throttle lever and is fastened to the lever at point 130.

Magnet 145 is in relation to two armatures 146 attached to shoes 147 which are free as long as the circuit is not energized. However, these shoes grip a disk or ring on the motor shaft when magnet 145 is energized. At the same time motor 136 begins to turn, the cord being wound on pulley 144, first drawing up arm 127 and the locking device 129 as far as it will go and then pulling throttle lever 134 to the left, turning on the steam. In turning off the steam, parts 134 and 135 are drawn together, releasing the lock. Then weight 124 drops and the lever turns to the right, pulling cord 132 with it and unwinding the cord from pulley 144. The magnet is not energized and turns with the pulley but does not operate the motor.

The disk or ring 136 which is gripped by shoes 147 may be mounted on a cog wheel operated by a worm or spiral on the motor shafting if the speed of the motor is too great.

When the clear signal is not displayed, magnet 123 will not operate the locking device and the engineer must support the throttle lever with his own weight in the position shown to keep the steam turned on. He might hold the lever in that position by keeping motor 136 energized; but in that case the heat generated in the armature might ruin it.

Magnet $H^2$ is controlled by home relay H and its armature 154. The circuit is as follows,—from generator G and brush 102, through wire 101, arm 154, contact post 153, wire 152, magnet $H^2$, wire 96 and brush 95 to the generator. When relay H is deënergized, magnet $H^2$ is also deënergized, and spring 149 pulls down armature 148 which opens a vent in valve 150, permitting train line pressure to escape to exhaust 151, thus making the emergency application of the brakes.

Relay D controls an arm 162 with a contact 161 above, operating magnet $D^2$ through a circuit as follows,—from brush 102 of generator through wire 101, magnet $D^2$, wire 160, contact 161, arm 162, wire 96 and brush 95 to the generator. When relay D is deënergized, magnet $D^2$ is also deënergized (except under conditions described later) and spring 156 draws on armature 155 connected to valve 157, opening a small vent and permitting air from the little drum to escape slowly through exhaust 158, thus making the service application of the brakes. A valve 159 may be used and exhaust pipes 158 and 151 may join in this valve and themselves exhaust through vent 163 when the handle 166 of the valve is in the position shown with spring 164 holding it against post 165.

If the engineer should desire to move his train when the brakes are thrown on automatically, he may turn handle 166 to the left in opposition to spring 164, thus closing the vent 163 and preventing any further escape of pressure. The handle will then close a circuit by coming in contact with contact 167. Red light 169 or some other signal device, which is located somewhere in full view of the crew or of others, lights up, showing that the engineer has tampered with the automatic devices. At the same time, he will throw his engineer's valve from running position to full release and back again to running position, all the while holding handle 166 to the left and keeping valve 159 closed.

As soon as the train line gage 170 shows that the pressure has been reduced to 62 pounds, a point carried by black hand 171 touches an adjustable plate of metal 172 connected to brush 95 of generator G by wire 96. This closes the break at point 161 through wire 96, plate 172, black hand 171 and wire 160. Thus the train line pressure is not reduced lower than 62 pounds and the brakes do not go into emergency. A motor 174 is connected direct to generator G and runs continuously. Motor 174 operates a commutator 177 by means of a series of cogs 175 and 176 so as to make about three revolutions of the commutator in sixty seconds. The break at point 161 is also closed at this point nearly all of the time, the insulated segment 178 opening the circuit here for about two seconds in each period of twenty seconds. The partial circuit consists of wire 96, brush 179, commutator 177, and wire 160. The width of segment 178 may be regulated at will by using a 24 segment commutator and connecting any number of the metallic segments together and to axle 180 and wire 160. At a speed of three revolutions per minute and having twenty-one segments connected as one, leaving three segments unconnected, magnet D² would not be deënergized until the three segments came up under brush 179 and the circuit would be broken here for two and a half seconds and then closed for seventeen and a half seconds, and so forth. If the train line pressure is reduced to 62 pounds in two seconds, magnet D² will again be energized and the vent in valve 157 will be closed. If the engineer's valve is in running position, the train line pressure will immediately begin to rise above 62 pounds and permit magnet D² to be again deënergized eighteen seconds later. Thus the train is brought to a stop gradually before entering the next block. Plate 172 may be adjusted to close the circuit at 63 pounds, 62, 61 or 60 pounds or even lower if it is desired to make a heavier application of the brakes in the start.

Arm 333 may be connected to wire 96 and have a contact 329 above, connected by wire 330 to lamp 331 which is also connected to wire 101. In this way, it is possible for the engineer to hear a click and see a flash of light 331 when the wheels pass over an insulated left hand rail. A similar device may be attached to magnet H¹. On a clear track, a constant succession of clicks and flashes will be observed showing that there are no crosses or grounds. A break in any circuit will prevent a clear signal and a cross or ground will silence the click of arm 333 and prevent the flash of light 331.

Other modifications may be made without departing from the spirit and scope of this invention.

What I claim is,—

1. In a train stop device, the combination of the equalizing reservoir of an air brake system, a valve connecting said reservoir with the atmosphere, a magnet normally holding the valve closed, a second valve connecting the train line with the atmosphere, a second magnet normally holding the second valve closed, and individual circuits controlling said magnets, each of said circuits including train carried terminals and track contacts coöperating therewith.

2. In a train stop device, the combination of the equalizing reservoir of an air brake system, a valve controlling the venting of said reservoir, a magnet for actuating said valve, a circuit controlling said magnet, means on the track for controlling said circuit, an air gage connected with the train line, a circuit including said magnet and contacts operated by the air gage and included in the last mentioned circuit.

3. The combination of a brake valve, a magnet for actuating the valve, two circuits controlling the magnet, means on the track for controlling one of the circuits, and means on the train for making and breaking the other circuit at predetermined intervals.

In witness whereof, I have signed this specification in the presence of two subscribing witnesses this twenty-third day of January, A. D. 1909.

ABRAM L. BOWER.

Witnesses at signing:
  JOHN G. HOUCK,
  WILLIAM H. FOX.